United States Patent Office 2,748,040
Patented May 29, 1956

2,748,040
POROUS ALLOYED WELDING FLUXES

William M. Conn, Kansas City, Mo.

No Drawing. Application April 3, 1952,
Serial No. 280,385

4 Claims. (Cl. 148—26)

The present invention is concerned with fluxes for electrically arc welding metal, for example, alloyed steel or boiler plate.

The main purpose of my invention is to combine the hereinafter mentioned chemical materials in such a manner as to produce porous alloyed welding fluxes which will, in welding, form a substantially molten pool containing some solid ingredients which will cause increased liberation of gases in the pool, vigorous stirring action or turbulence, and enhanced efficiency of the alloying ingredients. A porous slag having crystalline inclusions will be formed over the weld whereby the heat of the weld will be localized, resulting in slow cooling of the weld and improved strength, ductility, elongation, etc.

Another purpose of my invention is to produce fluxes which are inexpensive in the raw materials used, which are inexpensive to manufacture, and which are inexpensive and flexible in their use.

A further important purpose of the invention is to prevent undesirable results arising from dissolving by the flux materials out of the metal and by introducing other materials into the metal having compensatory effects. Other purposes of my invention will become apparent during the following specification.

Alloying and deoxidizing ingredients may be added, for example, to raw materials used in producing mullite containing fluxes (melting point of mullite equals approximately 1827° C.). My U. S. Patent No. 2,258,675, issued October 14, 1941, is cited as an example for producing a flux composed substantially of mullite. Alloyed and deoxidizing ingredients may also be added to mullite or some other high melting product. The batch is mixed and ground to pass an eight-mesh screen. It is dried and heated without fusing, to as low a temperature as possible for the formation of the flux base agent of high melting point, but sufficiently high to remove all physically and chemically bound water, as well as gas-forming ingredients. Temperatures may vary from about 900° C. to 1100° C.

The purpose of this invention cannot be accomplished if the batch is fused as a whole as in the prior art. Rather, it must be heated below the melting point of its main ingredient of high melting point. It is then cooled. The resulting hard material, for example in the shape of bricks or slabs, is then ground to the desired particle-size distribution.

In cases where large amounts of alloying ingredients or special alloying ingredients are required in a weld, it may be preferable to introduce part of such ingredients through the flux and part through the welding electrode, as for instance when welding armor plate.

The alloying additives I have found desirable either singly or in combination are: 0.2–25% manganese, chromium, nickel, molybdenum, cobalt and columbium. If deoxidizers are used, good results were obtained with the following materials: Elemental or alloyed silicon, titanium, zirconium, vanadium, aluminum, magnesium, all in amounts of 0.2–10%. The total amount of ingredients for alloying and deoxidizing purposes, when a number of such ingredients were used, ranged up to 70% of the weight of the flux. Table I presents examples of analyses of flux compositions for welding Grade A boiler plate.

Table I

| | Example #1 | Example #2 | Example #3 |
| --- | --- | --- | --- |
| | Percent | Percent | Percent |
| $SiO_2$ | 23.0 | 33.5 | 34.2 |
| $TiO_2$ and $Fe_2O_3$ | 3.0 | 3.4 | 3.6 |
| $Al_2O_3$ | 64.3 | 42.0 | 48.2 |
| $CaO$ | 4.7 | 4.7 | 5.1 |
| $MnO$ | 5.0 | 8.5 | 7.9 |
| Alkalies [1] | | 7.9 | 1.0 |
| | 100.0 | 100.0 | 100.0 |

[1] Soda and potash.

The $Fe_2O_3$ exists in the $Al_2O_3$ only in trace amounts as an impurity.

The above examples of flux compositions to which 2–10% fluoride may be added, show manganese as the principal alloying agent. They provided high porosity in the flux and the slag. They gave very satisfactory and much stronger and better annealed welds than obtained under the same operating conditions using pre-fused fluxes containing equivalent amounts of manganese. Similar improvements were obtained in tests with the remaining alloying ingredients above mentioned added to or incorporated in porous fluxes as distinguished from pre-fused fluxes. The differences in strength, ductility, elongation, etc. observed in alloyed porous fluxes when compared with alloyed pre-fused fluxes of the prior art, are very striking. The following explanations are offered:

It was determined by visual examinations, microscopic observations and X-ray diffraction tests that the slag from my flux, for example of particle size between 10 and 200 mesh, contained, even after use for submerged arc welding, unmolten crystalline particles, for example, mullite, both inside of the slag and surrounding it in a solid crust while the remainder of the slag was of a glassy nature. The particles of mullite did not melt in preparing the flux nor did they melt, except in a very thin outer layer, while the electric arc passed along the seam to be welded. This is a great improvement over the prior art for two reasons:

(1) The composition of the fluxes is such that they have low viscosity during welding, permitting easy passage of gas and vapor through the molten pool. The presence of solid flux ingredients in the molten pool, which will act as nuclei for the formation of gas bubbles, will speed up the release of gas and vapor from the pool. A vigorous stirring action is obtained in the pool which will enhance the intimate mixing of all alloying, deoxidizing and ferrous ingredients in the pool in the shortest possible time. Liberated gases will escape from the pool and pass through the layer of porous flux covering the welding area. Part of the gas will be trapped, upon cooling, in the slag and will increase the porosity of the slag.

It should be noted that this action of my fluxes permits also the welding of metal parts which are moist or dirty, contrary to pre-fused fluxes which can only be used because of the dense structure thereof for welding clean metal.

(2) Solid particles of high melting point floating on the molten pool during welding will form a protective crust or shell while the weld metal and the remainder of the slag are still in a plastic or semi-plastic condition, resulting in gradual freezing of the metal and the remainder of the slag.

In order to obtain porous, alloyed fluxes of high stability, I found it desirable to keep the amount of mullite between 10 and 80% in the fluxes. Thus, the basic flux agent material of the present invention remains partly unmelted during arc welding. Older fluxes will produce metallic silicates in pre-fusing or while melting during welding, for example, sodium aluminum silicates, calcium magnesium silicates. Such silicates have lower freezing points and lower rates of crystallization and melting than the basic flux agent materials of my invention and will completely melt in welding, producing a slag which is uniformly glassy. They will not quickly form protective crystalline crusts porous in nature over the weld, nor will they produce welds with such excellent ductility, strength, elongation as the fluxes of the present invention, nor will they permit the welding of moist or oily pieces.

The excellent alloying and deoxidizing actions of my flux, its heat insulating effect and the slowing down of the cooling are, therefore, due both to its chemical composition and its physical characteristics. The porosity of the flux is of importance for another reason. The density of the flux is much lower than the density of prior art fluxes. This makes it possible to weld a much greater linear footage of weld per pound of my flux than per pound of prefused flux. That means a further saving in cost by the use of my flux, in addition to the use of inexpensive raw materials, low processing costs and low crushing costs.

It will be obvious that the product of my invention may be used as a coating for rods, wire coils, or as a separate powdered material.

The typical formulae herein given are by way of example only, and it will be understood that variations therein will occur to those skilled in the art. The invention, therefore, should not be regarded as restricted except as required by the spirit of the following claims.

Having thus described the invention what is claimed as new and desired to be secured by Letters Patent is:

1. A welding flux based on the alumina-silica system with the addition of glass-forming oxides and composed of porous particles and adapted when used in welding to produce a crust and slag having crystalline inclusions therein, said flux consisting essentially of 23.0%–34.2% of $SiO_2$; 3.0%–3.6% of $TiO_2$; 42.0%–64.3% of $Al_2O_3$ containing in a trace amount as an impurity $Fe_2O_3$; 4.7%–5.1% of CaO; 5.0%–8.5% of MnO.

2. A welding flux based on the alumina-silica system with the addition of glass-forming oxides and composed of porous particles and adapted when used in welding to produce a crust and slag having crystalline inclusions therein, said flux consisting of 23.0% of $SiO_2$; 3.0% of $TiO_2$; 64.3% of $Al_2O_3$ containing in a trace amount as an impurity $Fe_2O_3$; 4.7% of CaO; and 5.0% of MnO.

3. A welding flux based on the alumina-silica system with the addition of glass-forming oxides and composed of porous particles and adapted when used in welding to produce a crust and slag having crystalline inclusions therein, said flux consisting of 33.5% of $SiO_2$; 3.4% of $TiO_2$; 42.0% of $Al_2O_3$ containing in a trace amount as an impurity $Fe_2O_3$; 4.7% of CaO; 8.5% of MnO; and 7.9% of alkalies.

4. A welding flux based on the alumina-silica system with the addition of glass-forming oxides and composed of porous particles and adapted when used in welding to produce a crust and slag having crystalline inclusions therein, said flux consisting of 34.2% of $SiO_2$; 3.6% of $TiO_2$; 48.2% of $Al_2O_3$ containing in a trace amount as an impurity $Fe_2O_3$; 5.1% of CaO; 7.9% of MnO; and 1.0% of alkalies.

References Cited in the file of this patent

UNITED STATES PATENTS

| | | |
|---|---|---|
| 2,043,960 | Jones | June 6, 1936 |
| 2,141,938 | Shepherd | Dec. 27, 1938 |
| 2,194,200 | Cohn | Mar. 19, 1940 |
| 2,258,675 | Cohn | Oct. 14, 1941 |
| 2,269,167 | Somerville et al. | Jan. 6, 1942 |
| 2,282,175 | Emerson | May 5, 1942 |
| 2,432,773 | Lee | Dec. 16, 1947 |
| 2,474,787 | Landis et al. | June 28, 1949 |
| 2,544,334 | Linnert | Mar. 6, 1951 |

FOREIGN PATENTS

| | | |
|---|---|---|
| 466,903 | Great Britain | June 8, 1937 |